(12) United States Patent
Chou

(10) Patent No.: US 6,367,854 B1
(45) Date of Patent: Apr. 9, 2002

(54) HANDLE DEVICE OF AN IMPACT HAND TOOL

(76) Inventor: Hwei-Rung Chou, 8F., No. 341, Sec. 4, Sinyi Rd., Taipei (TW)

( * ) Notice: Subject to any disclaimer, the term of this patent is extended or adjusted under 35 U.S.C. 154(b) by 0 days.

(21) Appl. No.: 09/562,770

(22) Filed: May 2, 2000

Related U.S. Application Data

(63) Continuation-in-part of application No. 09/515,619, filed on Feb. 29, 2000.

(51) Int. Cl.$^7$ ............................. A01B 1/22; B25G 1/04
(52) U.S. Cl. ........................... 294/57; 30/277; 81/463
(58) Field of Search ......................... 294/49, 51, 54.5, 294/55, 57, 61, 131; 15/144.4; 16/110.1, 429; 30/277; 56/400.01; 81/45, 177.2, 463; 125/40; 172/18, 371, 375; 173/90, 91, 211

(56) References Cited

U.S. PATENT DOCUMENTS

| | | | | |
|---|---|---|---|---|
| 1,294,304 A | * | 2/1919 | Pittman | 294/57 X |
| 2,485,877 A | * | 10/1949 | Hamilton | 30/277 X |
| 2,642,306 A | * | 6/1953 | Beeler | 294/61 |
| 3,232,355 A | * | 2/1966 | Woolworth | 294/57 X |
| 3,900,058 A | * | 8/1975 | McArdle | 81/463 |
| 4,829,673 A | * | 5/1989 | Hicks | 30/277 X |
| 4,928,560 A | * | 5/1990 | Bang | 81/463 |
| 5,040,614 A | * | 8/1991 | Nash | 30/277 X |
| 5,690,374 A | * | 11/1997 | Jacobs et al. | 294/57 |

FOREIGN PATENT DOCUMENTS

| | | | | |
|---|---|---|---|---|
| GB | 561688 | * | 5/1944 | 294/57 |

* cited by examiner

Primary Examiner—Johnny D. Cherry
(74) Attorney, Agent, or Firm—Varndell & Varndell, PLLC

(57) ABSTRACT

A handle device of an impact hand tool is proposed. The handle device is designed for an axial force to be applied thereto. An impact force can be used to assist the hand tool. The handle device includes a handle and an impact device. The front end of the handle has a rectangular hole. The impact device includes a confining cover, an elastic element, and a tool handle. The confining cover is a rectangular sleeve and the central top thereof contains a receiving groove. The front wall of the receiving groove has an inserting hole which penetrates to the front surface of the confining cover. An elastic element is installed in the receiving groove. The front end of the tool handle is a working portion and the rear section thereof has a handle post. The handle post can be inserted into an inserting hole of the confining cover and extend to the receiving groove. Therefore, a handle device of an impact hand tool is formed. As the user holds the handle and applies a force thereon, he (or she) operates the tool with less force and with an impact effect.

12 Claims, 11 Drawing Sheets

HANDLE DEVICE OF AN IMPACT HAND TOOL

The present invention is a continuation-in-part of a handle device for an impact type gardening tool of Ser. No. 09/515,619, filed Feb. 29, 2000, and relates to a handle device of an impact hand tool. The handle device is especially designed so that force can be applied in an axial direction. In use, the handle device is combined with, for example, a shovel or a rake, etc., where an impact force can be used to assist the functioning of the hand tool. As the user holds the handle and applies force thereto, he (or she) can operate the tool with less force to achieve an impact effect.

Conventionally, there are various handle tools or gardening tools used to apply an axial force. In general, these handle tools or gardening tools are combined with a handle at its distal end for being held conveniently and protecting the user's hand. For example, a prior art shovel can have a tool handle at the front end of a tapered shovel knife and a handle fixed at the distal end of the tool handle for the user to hold the shovel. An axial force can be applied to the handle. A prior art rake is an articulated structure with a tool handle installed at the top of the center thereof. The distal end of the tool handle is firmly secured with a handle for the user to dig earth.

However, the prior art only uses a handle combined with a tool handle. Generally, the handle is a pure plastic handle cover held by the user. Please consider the shovels or rakes commonly used in gardening to dig earth. If a large force is applied to the wrists can be hurt. Therefore, there is an eager demand for a handle device of an impact hand tool, which is especially designed for applying a force in an axial direction. The handle can be combined with a shovel or a rake, etc., and an impact force can be used with the hand tool. As the user holds the handle and applies a force thereon, he (or she) operates the tool with less force to achieve an impact effect.

Accordingly, the primary object of the present invention is to provide a handle device of an impact hand tool. The handle device of an impact hand tool includes a handle and an impact device. The front end of the handle has a rectangular hole. The impact device includes a confining cover, an elastic element, and a tool handle. A handle post of the handle can be inserted into an inserting hole of the confining cover and then extend to the receiving groove. Thereby, the handle post abuts the end portion of the elastic element, so that the impact device is firmly secured to the rectangular hole, and the handle device of an impact hand tool is formed. As the user holds the handle and applies a force thereon, he (or she) can operate the tool with less force to achieve an impact effect.

Another object of the present invention is to provide a handle device of an impact hand tool, wherein the pressable switch is installed in the front lateral side of the impact device. Thereby, the user may select a fixing operation mode or an impact operation mode which requires less force and has the impact effect.

The various objects and advantages of the present invention will be more readily understood from the following detailed description when read in conjunction with the appended drawing.

Figure 1:
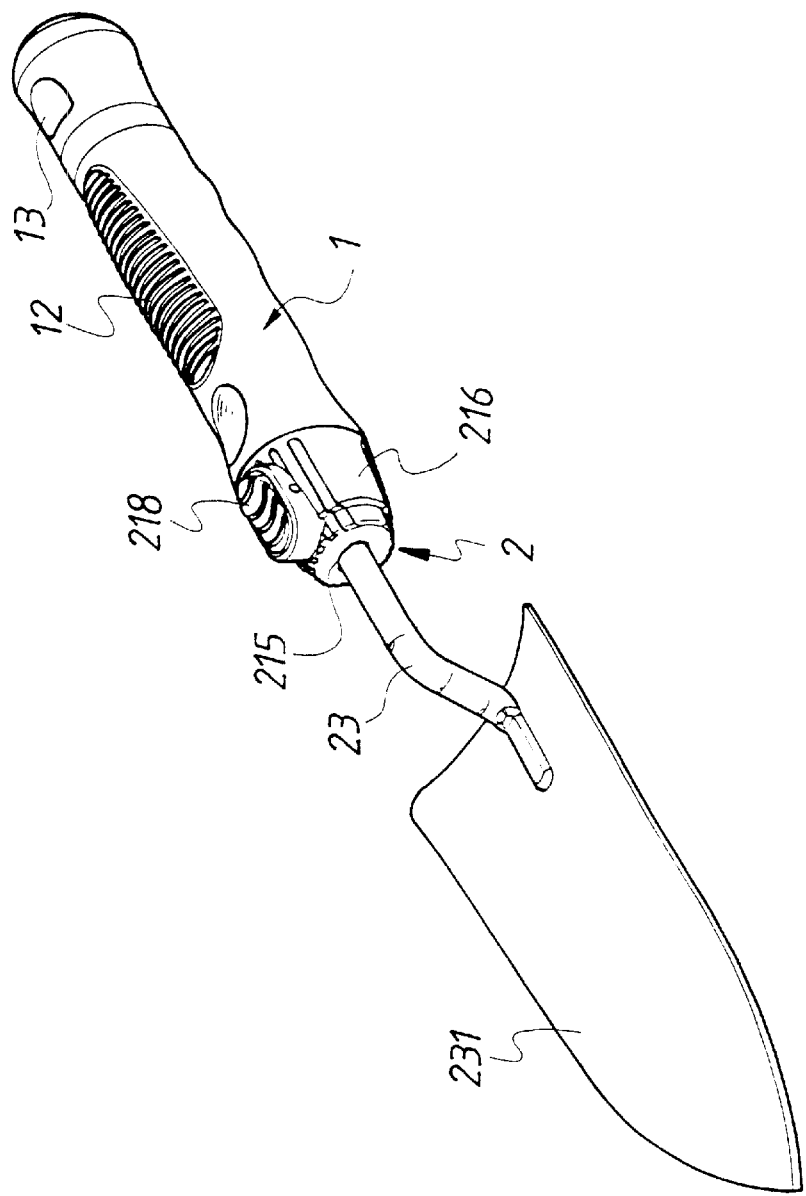
FIG. 1 is a schematic perspective view showing a shovel being combined with a handle device of an impact hand tool of the present invention.
Figure 2:
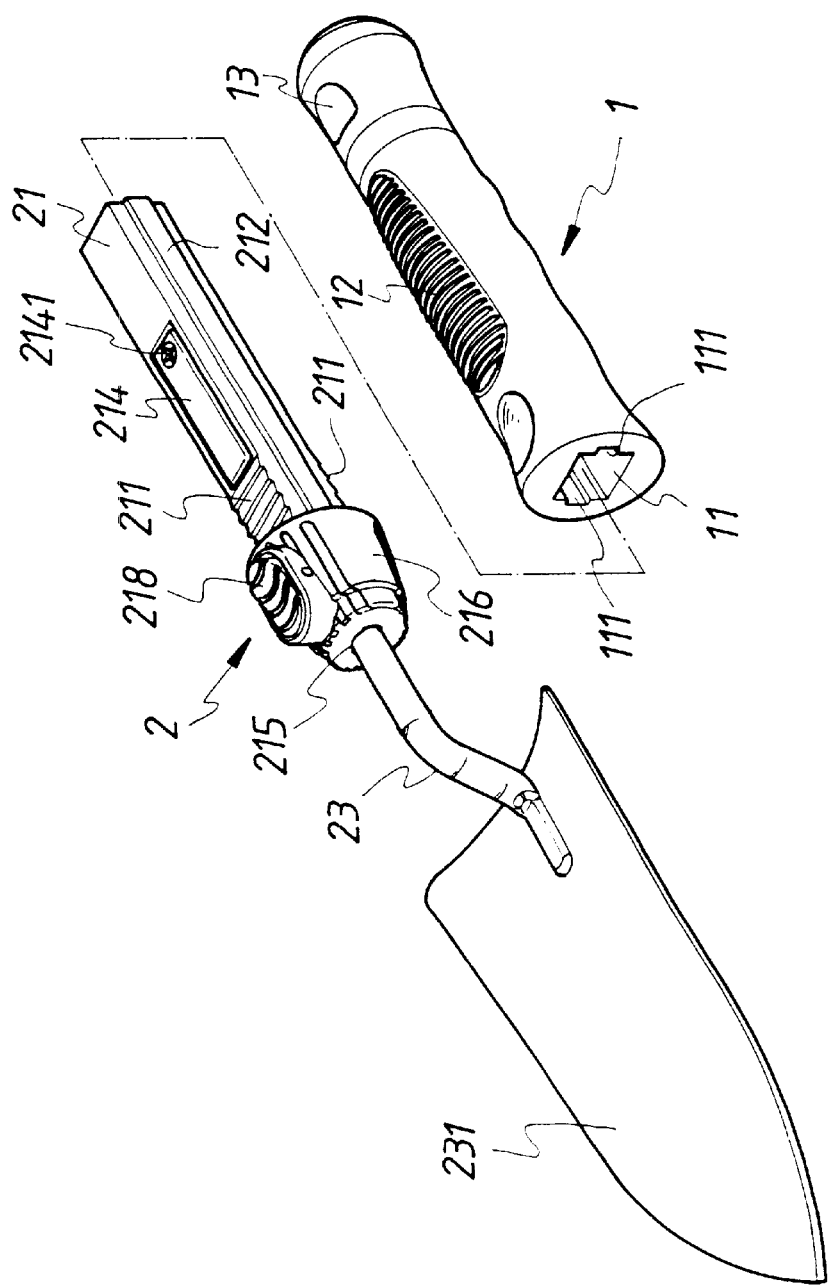
FIG. 2 is an exploded perspective view showing that the handle cover and the handle device of an impact hand tool in the present invention.

As shown in FIGS. 1 and 2, the handle device of an impact hand tool of the present invention is illustrated herein. The handle device of an impact hand tool includes a handle 1 and an impact device 2.

The handle 1 is a plastic or rubber handle for being held by a user. An axial concave rectangular hole 11 is formed at the front end thereof. Two lateral walls of the rectangular hole 11 are installed with respective guide grooves 111. The top of the handle body of the handle 1 has a texture portion 12 for stopping sliding. The distal end of the handle 1 has a hanging hole 13.

Figure 3:
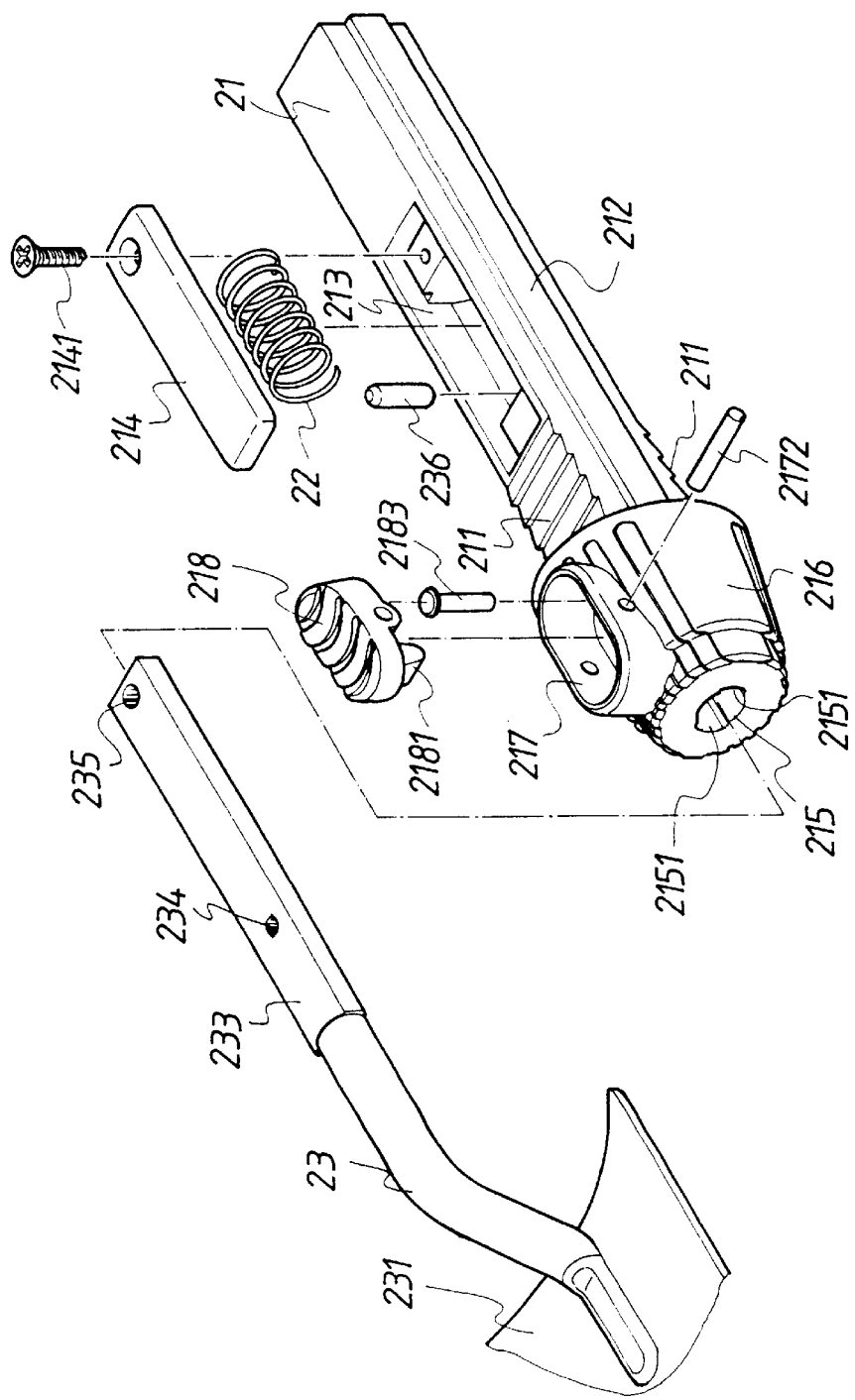
FIG. 3 is an exploded perspective view showing the impact device of the handle device of an impact hand tool in the present invention.
Figure 5:
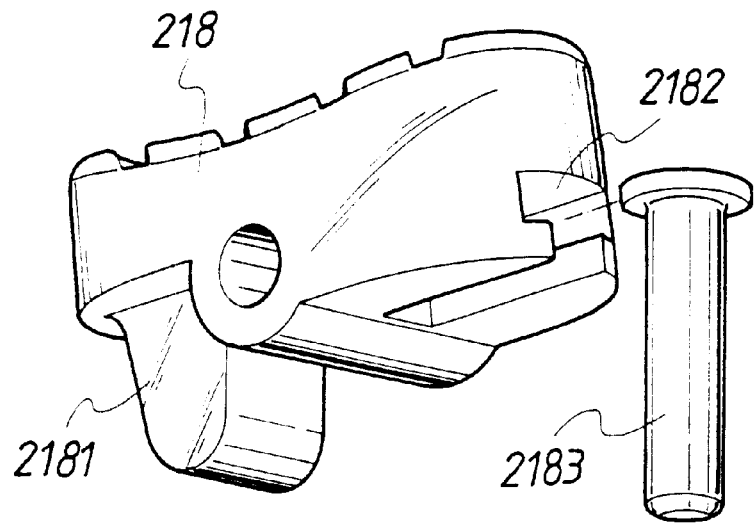
FIG. 5 is a schematic perspective view showing the button structure of the present invention.
Figure 6:
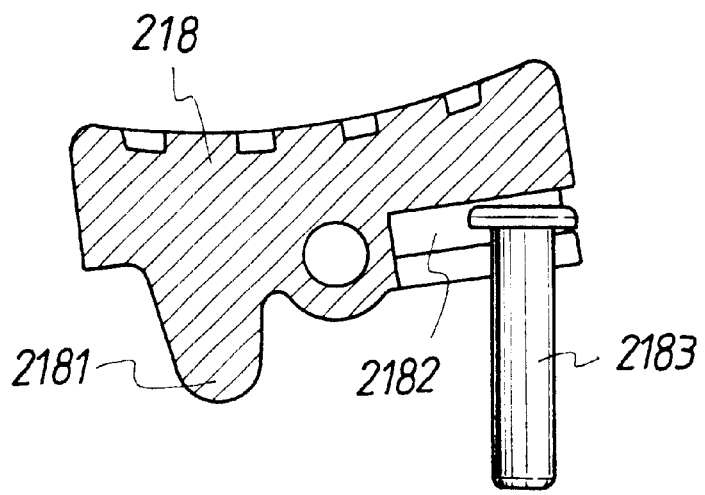
FIG. 6 is a schematic cross sectional view of the button in the present invention.

The impact device 2 includes a confining cover 21, an elastic element 22 and a tool handle 23. The confining cover 21 is a rectangular post. The upper and lower surfaces at the front section of the rectangular post are protruded with a plurality of teeth 211, each having a forward hook. Two sides of the rectangular post are installed with axial strips 212, respectively. At a proper position in the top of the rectangular post, there is a concave rectangular receiving groove 213. A rectangular sealing cover 214 covers the top of the groove 213 with a screw 2141. The front lateral wall of the receiving groove 213 has an inserting hole 215 which axially penetrate to the front end of the confining cover 21. The lateral walls of the inserting hole 215 are formed with respective tapered heads 216. The lateral surface of the head 216 is concave and is formed with an elliptical key slot 217. The rear portion of the slot is formed with a via hole 2171 which vertically communicates with the inserting hole 215. In the key slot 217, a pin 2172 from the lateral side thereof, and an elliptical piece button 218 (as shown in FIG. 3) are radially and pivotally installed. The bottom front end of the button 218 has a supporting block 2181, and the bottom at the rear end has a T shape groove 2182. The pin 2183 with a top hat is engaged with the T shape groove 2182 (as shown in FIGS. 5 and 6), so that the pin 2183 passes through the via hole 2171 of the key slot 217 and telescopically moves with the motions of the button 218.

Figure 7:
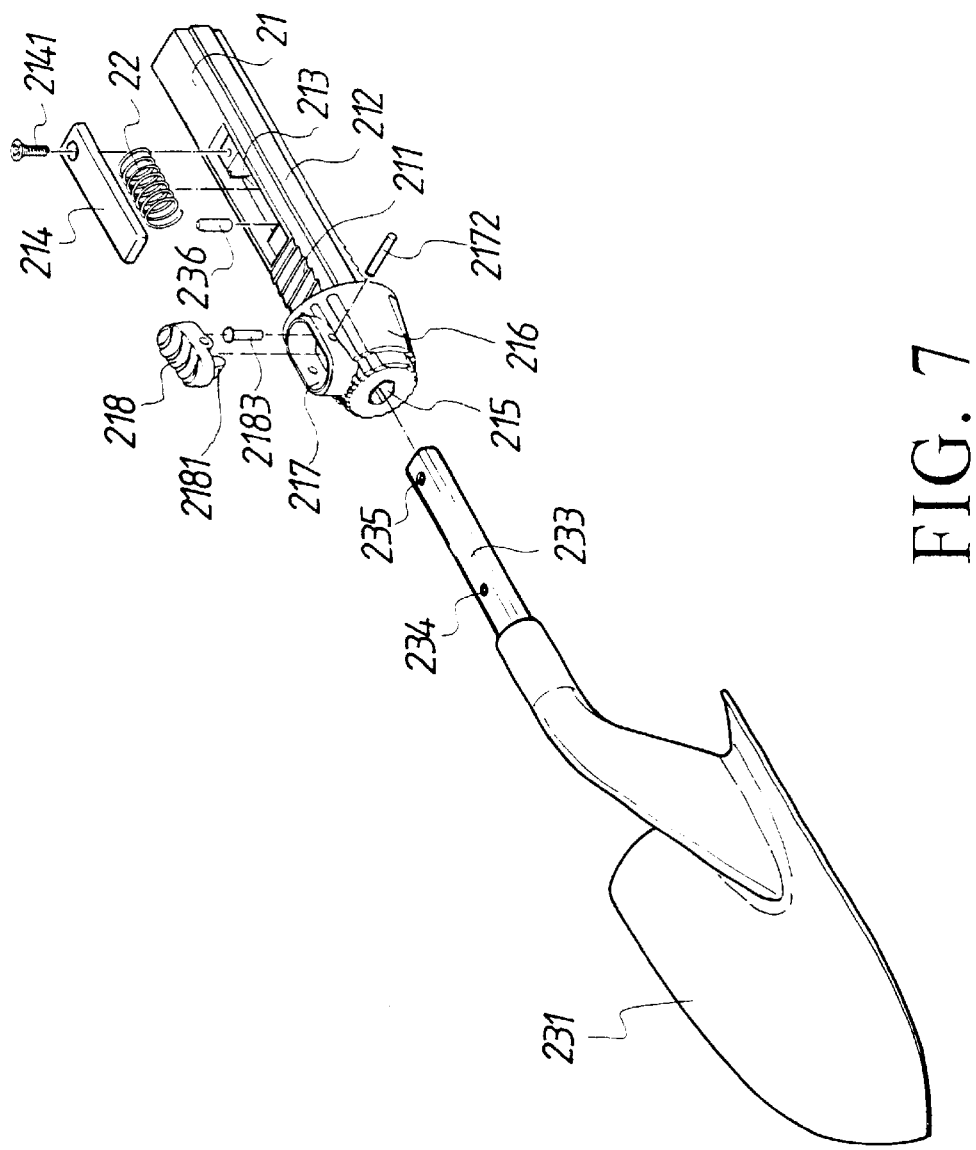
FIG. 7 is an exploded perspective view showing another shovel structure and the impact device in the present invention.

The elastic element 22 is a conventional compressible spring. The tool handle 23 is a metal round rod. The front end of the tool handle has a shovel, or other working portion, welded thereon (as shown in FIGS. 3 or 7). The rear section of the tool handle 23 can be directly shaped or welded with a handle post 233, which can be a rectangular post. At a proper place at the top of the handle post 233, a hole 234 is provided. The distal end of the handle post 233 is formed with a vertical penetrating hole 235. A pin 236 can be vertically installed in the distal end of the handle post 233 into the penetrating hole 235.

Figure 4:
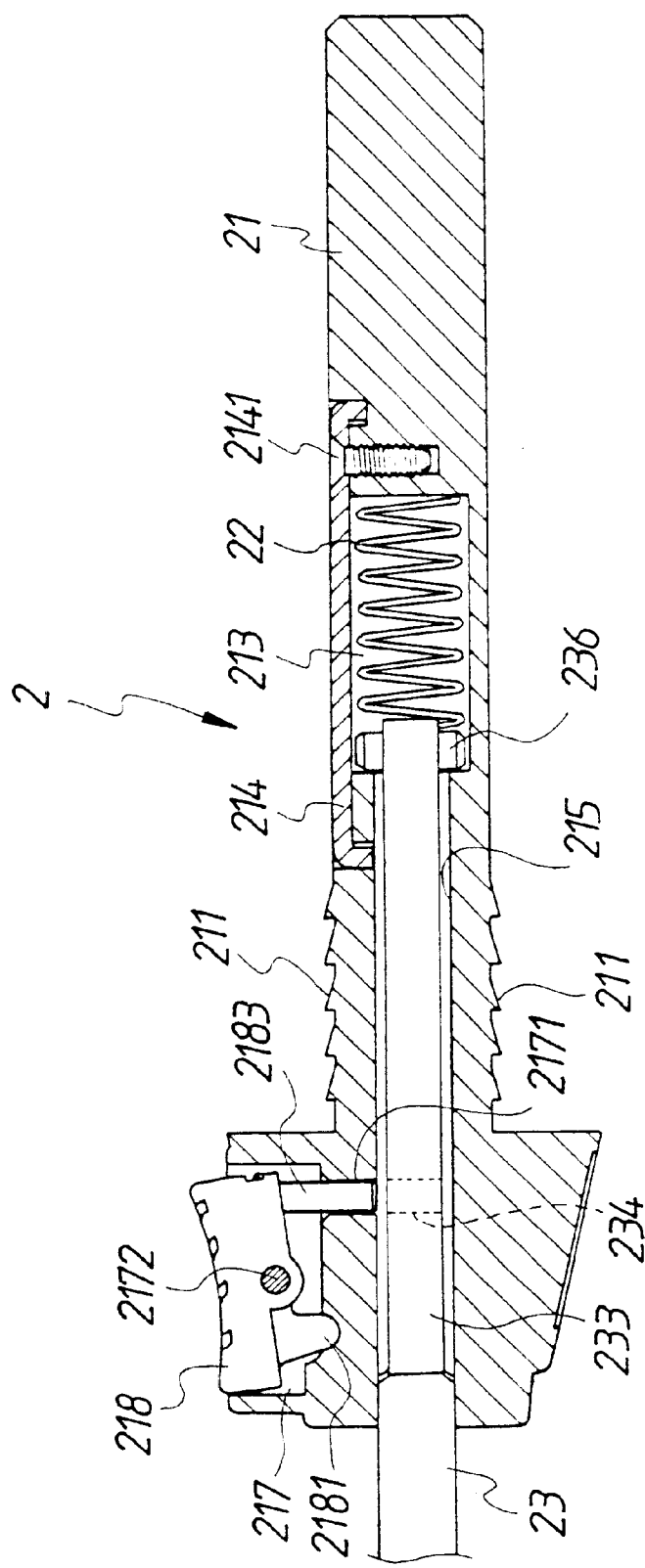
FIG. 4 is an assembled cross sectional view showing the handle device of an impact hand tool being used with a shovel.

As shown in FIGS. 3 and 4, the elastic element 22 of the compressible spring is flatly arranged in the receiving groove 213 of the confining cover 21. The handle post 233 of the tool handle 23 is inserted into the grooves 2151 at two sides of the inserting hole 215 of the confining cover 21. By this arrangement, the tool handle 23 only moves axially and telescopically and without any rotation about its axis. The hole 234 at the top of the handle post 233 is exactly aligned with the via hole 2171 of the key slot 217. The distal end of the handle post 233 passes through to the receiving groove 213. After a pin 236 passes through the penetrating hole 235 of the handle post 233, a structure is formed, in which the distal end of the handle post 233 pushes against the front end of the elastic element 22 through the pin 236. Whereby, a structure with an impact function is formed, so that when the tool handle 23 is axially compressed, the handle post 233 is ejected by the elastic element 22. The screw 2141 locks a sealing cover 214 on the receiving groove 213, thereby forming an impact device for a hand tool according to the present invention.

The rectangular hole 11 in the front end of the handle 1 engages the rectangular post of the confining cover 21 from the rear end of the impact device 2 (as shown in FIGS. 2 and 7). The handle is designed so that the teeth 211 at the front section of the rectangular post of the confining cover 21 are coupled to the guide groove 111 of the rectangular hole 11 in the handle 1. In this manner, the handle 1 and the impact device 2 are secured together. As a result, a handle device of an impact hand tool according to the present invention is formed. A shovel structure 231 can be further combined with the handle so that an impact shovel is formed (as shown in FIG. 7).

Figure 8:
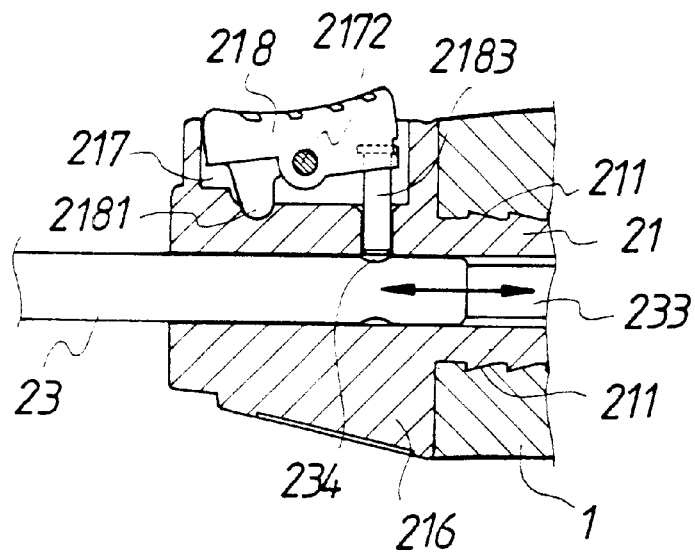
FIG. 8 is an operation schematic view showing the impact action of the present invention.
Figure 9:
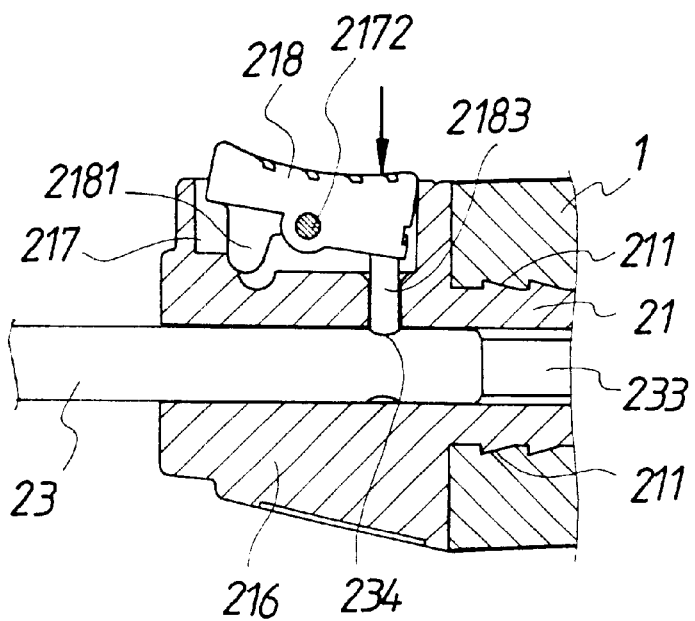
FIG. 9 is an operation schematic view of the tool handle with a selection button.

The effect of the present invention will be described as follows. When a user uses the impact shovel according to the present invention in gardening, the shovel knife 231 is firstly inserted into the earth. The user applies a continuous force to the handle 1. The handle 1 and the impact device 2 telescopically move on the tool handle 23 (as shown in FIG. 8) so that knife 231 can be gradually inserted into the earth. Therefore, if the present invention is combined with a shovel, the combination can be used in gardening. If the user does not want to use the impact function, the button 218 in front of the impact device 2 can be pressed downwards (as shown in FIG. 9, so that the pin 2183 in the via hole 2171 descends and is inserted into the hole 234 of the tool handle 23. In this condition, the tool handle 23 can not move axially. In the present invention, as the user works, the impact function of the present invention is provided, which is selectable by the user.

Figure 10:
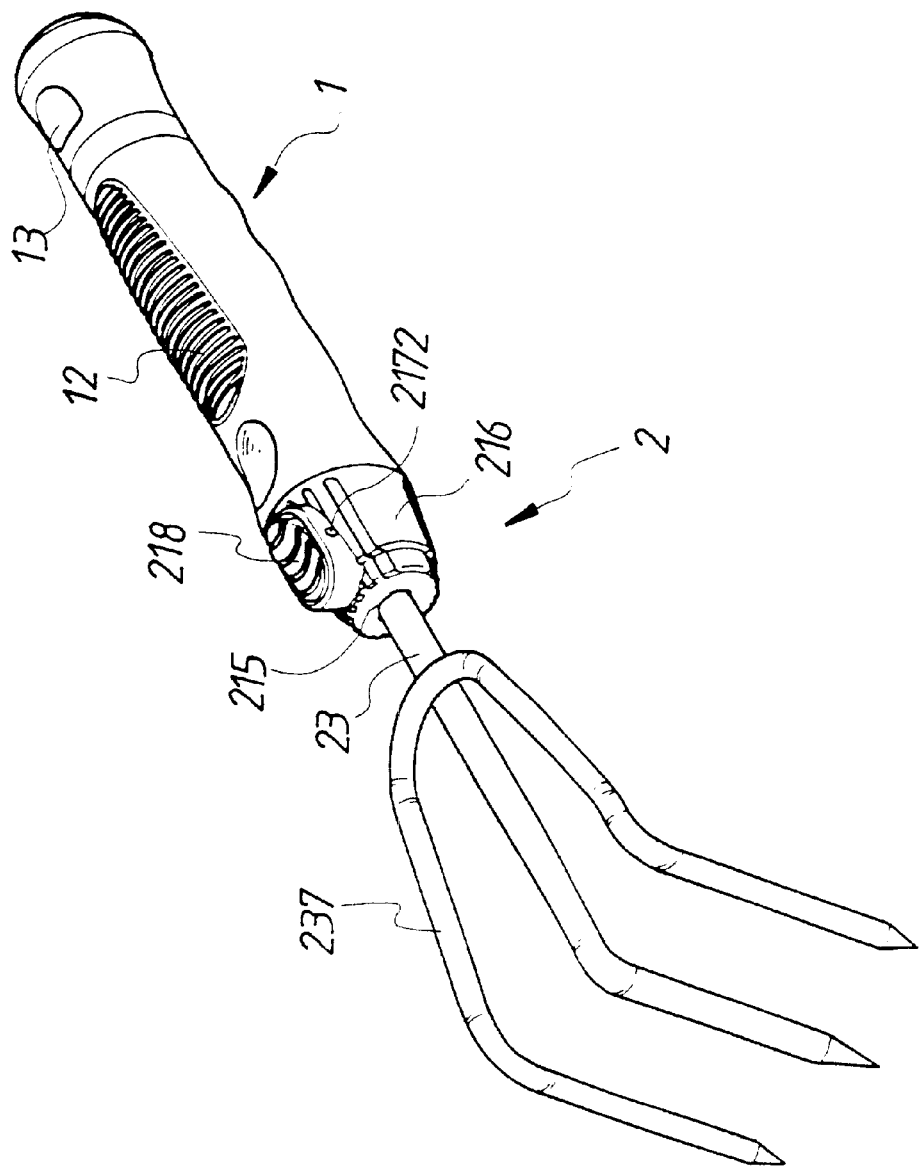
FIG. 10 is a schematic perspective view showing that a handle device of an impact hand tool of the present invention is combined with a rake.
Figure 11:
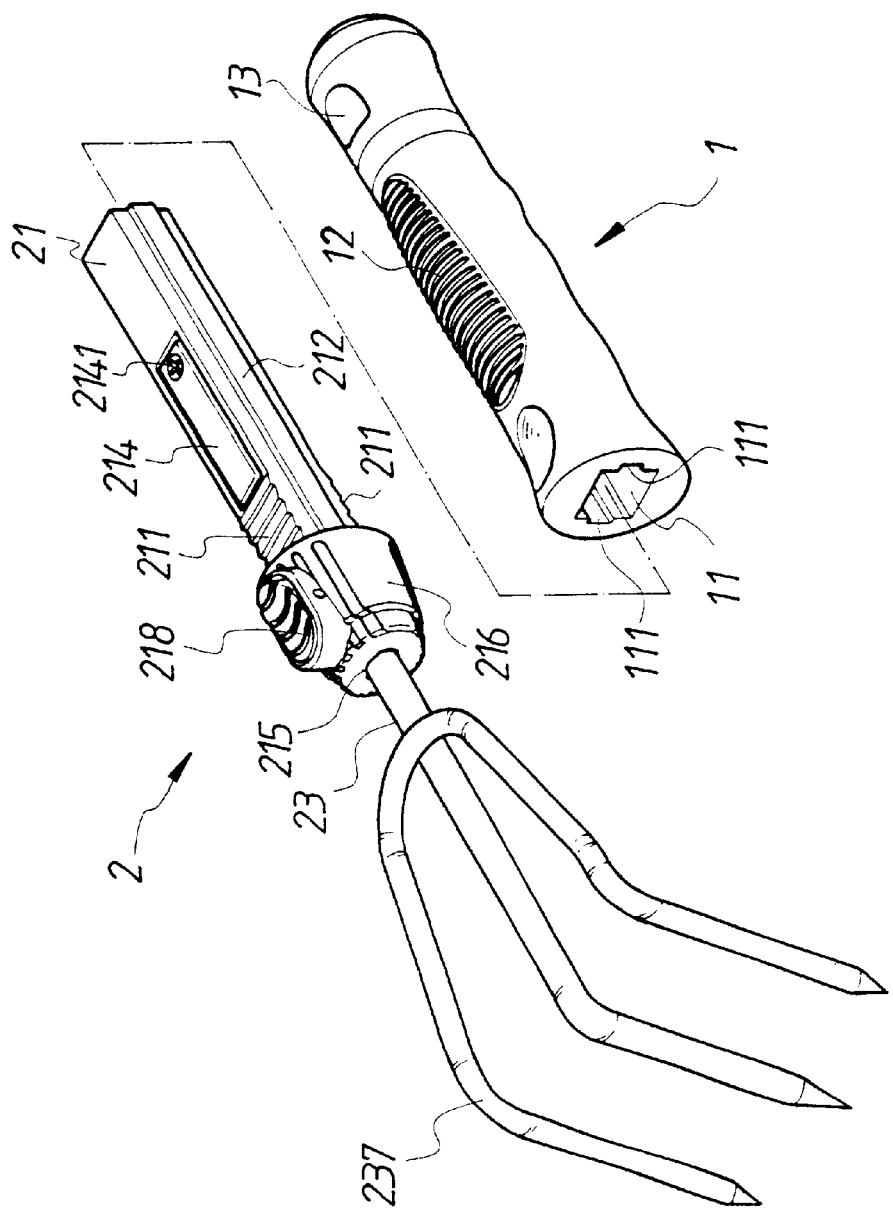
FIG. 11 is a exploded perspective view showing that a rake is combined to the present invention and a handle cover.
Figure 12:
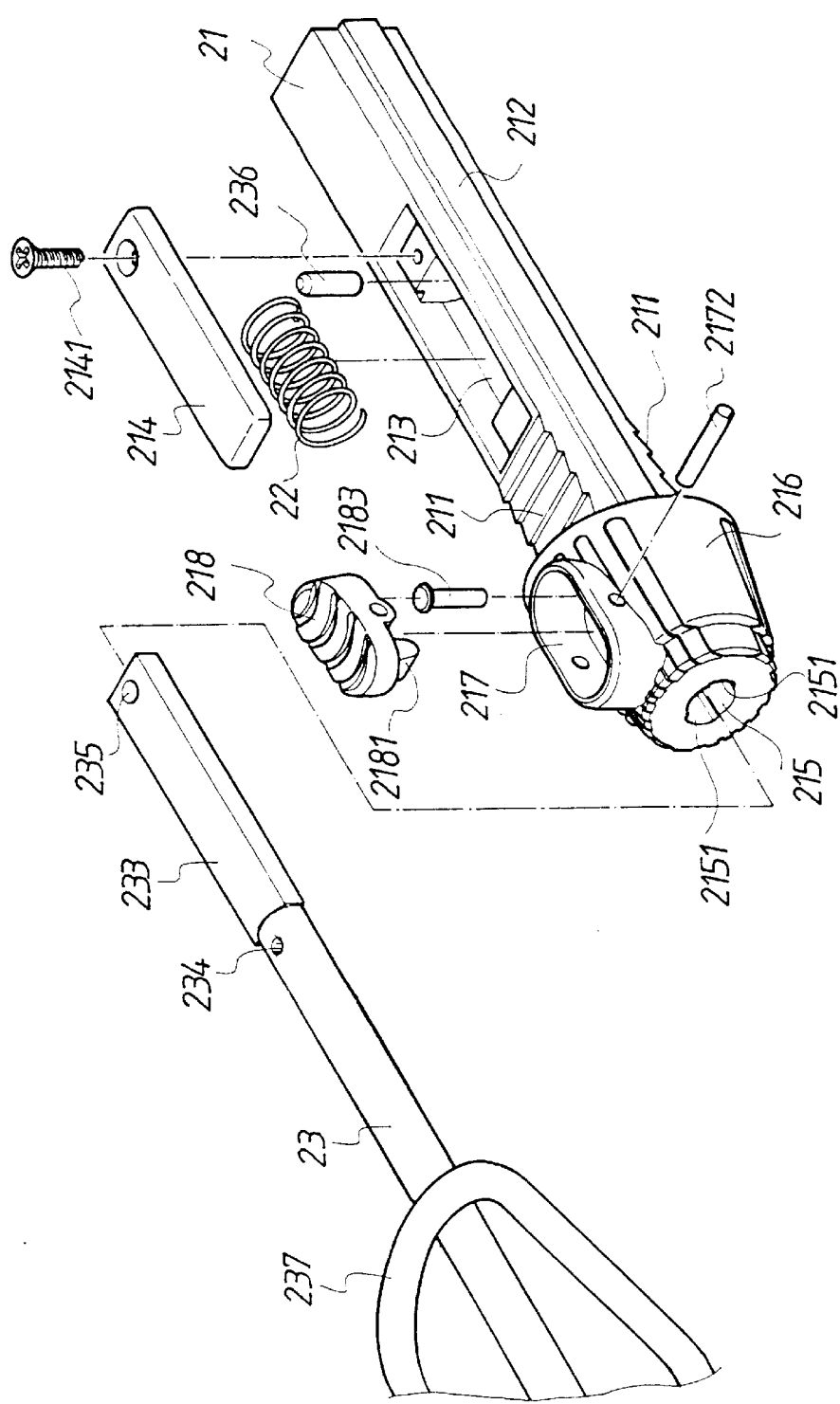
FIG. 12 is an exploded perspective view showing the impact device in the handle device of an impact hand tool according to the present invention that is used with a rake.
Figure 13:
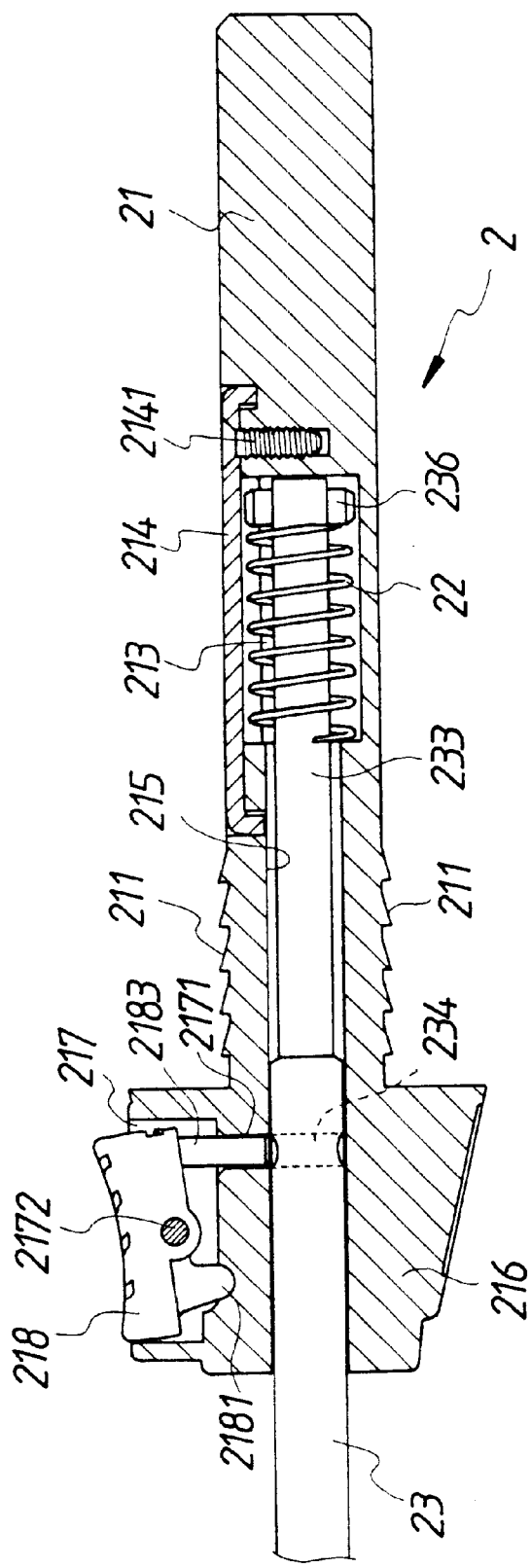
FIG. 13 is an assembled cross sectional view showing that the handle device of an impact hand tool of the present invention is used with a rake.

Furthermore, the aforesaid embodiment is only an example where a downward (or upward) force is applied to the tool handle. The present invention can be used in a tool handle for other implements, such as a rake, where the handle post 233 of the tool handle 23 is extended (as shown in FIGS. 12 and 13). The handle post 233 can be formed as an elastic element 22 extending to the compressible spring. The pin 236 is firmly secured to the penetrating hole 235 at the rear end of the handle post 233; Thus, a structure is formed, in that the distal end of the handle post 233 resists against the rear portion of the elastic element 22 by a pin 236. With this arrangement, as the tool handle 23 axially extends, it can be ejected by the elastic element 22 to move backwards. Thus, an impact device is formed. A rearward pull working portion, such as rake 237, can be welded to the front end of the tool handle 23. Therefore, an impact device rake tool handle according to the present invention is formed (as shown in FIGS. 10 and 11). When the front end of the rake 237 is inserted into the earth, a force is continuously applied to the handle 1 and the impact device 2 which move backwards and compress elastic element 22 against the pin 236 of the tool handle 23, so that the tool handle 23 generates a gradually impacted force. The earth thereby becomes loose without needing a very large force. However, if the user desires not to use the impact function of the rake, the button 238 of the impact device 2 can be pressed downwards and backwards (FIG. 9), and the impact function is disengaged, and only a general rake function is used. Therefore, by this design, the user may select the required function.

An advantage of the present invention is to provide a labor-saving hand tool, especially in gardening, that can avoid wrists applying a large force so they are hurt. However, the uses of shovel and rake are only two embodiments. The front end of the tool can be installed with other working implements, such a chisel, cruciform pick, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What I claim is:

1. A handle device of an impact hand tool comprising a handle and an impact device, the handle including a cylindrical handle cover for hand holding by a user, the cylindrical handle cover having a front end with an axial rectangular hole;

the impact device including a confining cover, an elastic element and a tool handle; the confining cover being a rectangular post with a front end, a top and axial strips; a rectangular receiving groove arranged in the top of the rectangular post, an inserting hole arranged in the rectangular receiving groove and axially penetrating the front end of the confining cover, the inserting hole having side grooves bilaterally arranged therein; the tool handle being a metal rod with a front end and a rear section, the front end of the metal rod having a working portion welded thereto, the rear section of the tool handle including a handle post fixed thereto; the handle post having a distal end formed with a vertical penetrating hole, and the vertically penetrating hole receiving a pin;

wherein the elastic element has a front end and includes a compressible spring arranged in the receiving groove of the confining cover; the handle post of the tool handle is inserted into the inserting hole of the confining cover and aligned within the side grooves of the inserting hole, so that the distal end of the handle post extends to the receiving groove and the tool handle moves axially and telescopically without rotation; the pin is received in the vertical penetrating hole of the handle post, so that the distal end of the handle post engages the front end of the elastic element through the pin and thereby provides an impact function, in which as the tool handle is axially compressed, the elastic element is compressed and exerts a force on the metal post of the tool handle and thereby on the working portion.

2. The handle device of an impact hand tool as claimed in claim 1, wherein two lateral walls of the axial rectangular hole at a front end of the cylindrical handle have respective guide grooves.

3. The handle device of an impact hand tool as claimed in claim 1, wherein the side grooves of the inserting hole of the confining cover of the impact device are axially extending rectangular grooves.

4. The handle device of an impact hand tool as claimed in claim 1, wherein the metal post of the tool handle has a rectangular cross-section.

5. The handle device of an impact hand tool as claimed in claim 1, wherein a front section of the rectangular post of the confining cover has upper and lower surfaces with a plurality of teeth each having a forward hook; the rectangular hole at the front end of the handle receiving and holding the rectangular post of the confining cover by the plurality of teeth.

6. The handle device of an impact hand tool as claimed in claim 1, wherein the receiving groove of the confining cover is covered with a rectangular sealing cover.

7. The handle device of an impact hand tool as claimed in claim 1, wherein the confining cover has an end head with a larger diameter, a lateral side of the head is concave and provided with an elliptic key slot for receiving a key, the key enabling switching the tool handle between a fixed operation mode and an impact operation mode.

8. The handle device of an impact hand tool as claimed in claim 1, wherein the confining cover has a key slot with a rear portion, the rear portion of the key slot has a switch hole that vertically communicates with the inserting hole; an elliptical button is radially and pivotally installed in the key slot, the elliptical button has a front end of the button with a supporting block and a rear end with a T-shaped groove, a pin extends from a bottom of the elliptical button through the switch hole of the key slot and is telescopically moved with the motions of the button so as to be inserted into a hole of the tool handle, whereby the tool handle is selectable between a fixing operation mode and an impact operation mode.

9. The handle device of an impact hand tool as claimed in claim 1, wherein a front end of the tool handle is welded with a shovel or a rake.

10. The handle device of an impact hand tool as claimed in claim 1, wherein a top lateral side of the handle has a texture portion for sliding-preventing.

11. The handle device of an impact hand tool as claimed in claim 1, wherein the elastic element is a helical compressing spring.

12. The handle device of an impact hand tool as claimed in claim 1, wherein the elastic element engages a rear section of the handle, and a rear end of the elastic element resists against one lateral surface of the pin.

\* \* \* \* \*